United States Patent
Nishio et al.

[11] Patent Number: 6,001,455
[45] Date of Patent: Dec. 14, 1999

[54] SHEET-SHAPED PRODUCT OF THERMOPLASTIC ELASTOMER

[75] Inventors: Takeyoshi Nishio, Okazaki; Takao Nomura, Toyota; Yukio Okishio, Hamakita; Ichiro Nishi; Tatsuo Yamamoto, both of Hamamatsu; Junji Mayumi, Yokkaichi; Takao Usami, Yokkaichi; Takao Yazaki, Yokkaichi, all of Japan

[73] Assignees: Mitsubishi Chemical Corporation, Tokyo-To; Toyota Jidosha Kabushiki Kaisha, Toyota; Kyowa Leather Cloth Co.,Ltd, Hamamatsu, all of Japan

[21] Appl. No.: 08/425,038

[22] Filed: Apr. 18, 1995

[30] Foreign Application Priority Data

Apr. 19, 1994 [JP] Japan ................................. 6-080422
Apr. 17, 1995 [JP] Japan ................................. 7-091170

[51] Int. Cl.⁶ ............................. B32B 3/00; B32B 27/32
[52] U.S. Cl. .......................... 428/156; 428/409; 525/88; 525/194; 525/240; 524/528
[58] Field of Search ..................... 428/156; 525/194, 525/240, 88; 524/528

[56] References Cited

U.S. PATENT DOCUMENTS

| | | | |
|---|---|---|---|
| 4,128,606 | 12/1978 | Furutachi et al. | ....................... 525/240 |
| 4,130,535 | 12/1978 | Coran et al. . | |
| 4,212,787 | 7/1980 | Matsuda et al. . | |
| 4,454,092 | 6/1984 | Shimizu et al. . | |
| 4,985,502 | 1/1991 | Izumi et al. . | |
| 5,001,182 | 3/1991 | Maruya et al. | ......................... 524/427 |
| 5,308,699 | 5/1994 | Hikasa et al. . | |
| 5,308,700 | 5/1994 | Hikasa et al. . | |
| 5,733,980 | 3/1998 | Cozewith et al. | ....................... 525/314 |

FOREIGN PATENT DOCUMENTS

| | | |
|---|---|---|
| 2093295 | 10/1993 | Canada . |
| 0 436 724 | 7/1971 | European Pat. Off. . |
| 0153415 | 2/1985 | European Pat. Off. . |
| 0 493 947 | 7/1992 | European Pat. Off. . |
| 0 568 815 | 11/1993 | European Pat. Off. . |

*Primary Examiner*—Donald R. Wilson
*Attorney, Agent, or Firm*—Oblon, Spivak, McClelland, Maier & Neustadt, P.C.

[57] ABSTRACT

There is provided a sheet-shaped product of a thermoplastic elastomer provided with an embossed pattern on the surface thereof, comprising as a base material a component (II) comprising a thermoplastic elastomer, said elastomer being obtained by subjecting a composition (I) comprising the following components (A) and (B) to dynamic heat treatment carried out in the presence of an organic peroxide: component (A): from 10 to 75% by weight of an olefin resin containing 50 to 100% by weight of a crystalline propylene polymer resin, and component (B): from 90 to 25% by weight of an olefin copolymer rubber containing 10 to 100% by weight of an olefin-propylene copolymer rubber whose propylene content is from 65 to 90% by weight.

13 Claims, No Drawings

SHEET-SHAPED PRODUCT OF THERMOPLASTIC ELASTOMER

BACKGROUND OF THE INVENTION

1. Field of the Invention

The present invention relates to a sheet-shaped product of a thermoplastic elastomer. More specifically, the present invention relates to a sheet-shaped product of a thermoplastic elastomer provided with an embossed pattern on the surface thereof, which shows excellent uniform extensibility and emboss (embossed-pattern) retention when it is subjected to secondary forming such as vacuum forming, pressure forming, stamping forming or the like, and which is advantageously used for the skin of automobile parts, furnitures and the like.

2. Background Art

Heretofore, a polyvinyl chloride has been employed as a base material for a sheet for interior automotive trim, which is used for the skin of an instrument panel, a door trim and the like. However, due to the trend toward light-weight automotive parts and in order to meet the demand, from environmental viewpoints, for automotive parts which can be reused or thermally disposed without difficulty, it has begun to put a thermoplastic polyolefin elastomer material (hereinafter may be simply referred to as "TPO") into practical use in recent years.

For example, Japanese Laid-Open Patent Publication No. 1888/1994 discloses a sheet-shaped product based on TPO comprising an olefin copolymer rubber, an olefin copolymer and a crystalline paraffin.

However, the conventional sheet-shaped products of olefin thermoplastic elastomer have the drawback that they show poor extensibility when subjected to secondary forming such as vacuum forming, pressure forming, stamping forming or the like, so that the product with a high draw ratio tends to become torn or become extremely thin.

Further, an embossed pattern is generally provided on the surface of skin materials for interior automotive trim, used for an instrument panel, a door trim and the like so as to impart thereto a leather-like texture. When the conventional sheets made of TPO which are provided, in advance, with such an embossed pattern are subjected to secondary forming such as vacuum forming, debossing (flatting out of the embossed pattern) is likely to occur due to heat applied or deformation caused in the course of the forming process. Thus, there has been a problem in emboss retention. In order to avoid such debossing, a method in which vacuum forming is conducted by using a female metal mold provided with an embossed pattern has been adopted. However, there is still such a problem that only an embossed pattern which is flatter than that of the metal mold is obtained.

It is, therefore, a primary object of the present invention to provide a sheet-shaped product of thermoplastic elastomer which shows excellent uniform extensibility and excellent emboss retension.

SUMMARY OF THE INVENTION

It has now been found that the above object can be attained by a sheet-shaped product of a thermoplastic elastomer provided with an embossed pattern on the surface thereof, comprising as a base material a composition (II) comprising a thermoplastic elastomer, said elastomer being obtained by subjecting a composition (I) comprising the following components (A) and (B) to dynamic heat treatment carried out in the presence of an organic peroxide:

component (A): from 10 to 75% by weight of an olefin resin containing 50 to 100% by weight of a crystalline propylene polymer resin, and component (B); from 90 to 25% by weight of an olefin copolymer rubber containing 10 to 100% by weight of an olefin-propylene copolymer rubber whose propylene content is from 65 to 90% by weight.

It is preferred that the composition (I) or the composition (II) further comprise at least one of the following components (C) to (E):

component (C): 10–250 parts by weight, based on 100 parts by weight of polymer (A), of a low-molecular weight olefin polymer having a melt flow rate of 100 g/10 min or more as determined at 230° C. under a load of 2.16 kg, and a melting point of 80° C. or higher, component (D): 10–500 parts by weight, based on 100 parts by weight of polymer (A) of a propylene block copolymer consisting of the following blocks (a) and (b):

block (a): a block containing 90 to 100% by weight of propylene, having a melt flow rate of 50 g/10 min or more as determined at 230° C. under a load of 2.16 kg, selected from the following (a1), (a2) and (a3):

(a1): a propylene homopolymer block, (a2): a block of a binary random copolymer of propylene with ethylene or with an alpha-olefin having 4 to 12 carbon atoms, and (a3): a propylene homopolymer block and a block of a binary random copolymer of propylene with ethylene or with the above alpha-olefin; and block (b): a block containing 20 to 100% by weight of ethylene, selected from the following (b1), (b2) and (b3):

(b1): an ethylene homopolymer block, (b2): a block of a binary random copolymer of ethylene with an alpha-olefin having 3 to 12 carbon atoms, and (b3): an ethylene homopolymer block and a block of a binary random copolymer of ethylene with the above alpha-olefin, and component (E): 10–200 parts by weight, based on 100 parts by weight of polymer (B), of a rubber-softening agent.

Further, it is preferred that the composition (II) further comprises the following component (F):

component (F): 10–300 parts by weight, based on 100 parts by weight of the sum of component (A) and component (B), of an olefin resin or elastomer.

These sheet-shaped products of thermoplastic elastomers of the present invention show excellent uniform extensibility and emboss retention when they are subjected to a secondary forming, such as vacuum forming, pressure forming or the like, and thus can advantageously be used for interior automotive trim, for example, as skin materials for an instrument panel, a door trim, a console box, a ceiling sheet and a steering wheel pad, leather-like sheets for car seats, skin materials for furnitures, and the like.

DETAILED DESCRIPTION OF THE INVENTION

[1] COMPONENTS

Component (A): Olefin Resin

Component (Aa): Crystalline Propylene Polymer Resin

The olefin resin used as the component (A) in the present invention is an olefin resin containing 50 to 100% by weight of a crystalline propylene polymer resin (Aa).

Examples of the crystalline propylene polymer resin (Aa) include propylene homopolymer, a random copolymer of propylene and 10% by weight or less of another alpha-olefin such as ethylene, butene-1 or hexene-1, and a block copolymer consisting of a propylene homopolymer block and a propylene-another olefin copolymer block, containing 30% by weight or less of another alpha-olefin.

The crystalline propylene polymer resin (Aa) is one whose crystallinity determined by X-ray diffractometry is 35% or more, preferably from 40 to 80%. It is to be noted that all of the crystallinity values shown hereinbelow are those determined by X-ray diffractometry.

The use of the crystalline propylene polymer resin (Aa) whose crystallinity is less than 35% will provide a sheet-shaped product having a poor emboss retention.

It is preferable to use, as the crystalline propylene polymer resin (Aa), a resin whose malt flow rate (MFR) determined in accordance with ASTM-D1238 at 230° C. under a load of 2.16 kg is from 0.01 to 100 g/10 min, particularly from 0.1 to 80 g/10 min, and more particularly from 0.1 to 20 g/10 min.

The number-average molecular weight of the crystalline propylene polymer resin (Aa) is generally from 35,000 to 200,000, preferably from 36,000 to 150,000, more preferably from 50,000 to 150,000.

Component (Ab): Another Olefin Resin

In the present invention, another olefin resin (Ab) can be incorporated in addition to the above-described crystalline propylene polymer resin (Aa), the essential component.

Examples of such an olefin resin (Ab) include a homopolymer of an olefin other than propylene, for example, an alpha-olefin such as ethylene, butene-1 or hexene-1, or a cyclic olefin represented by the following general formula (I):

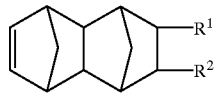

(I)

wherein $R^1$ and $R^2$, which may be the same or different, each represent hydrogen, an alkyl group having 1 to 10 carbon atoms or a halogen atom;

a copolymer of two or more of the above olefins other than propylene; and a copolymer of one of the above alpha-olefins and a polymerizable monomer other than the alpha-olefin, such as vinyl acetate, acrylate, methacrylate, acrylic acid or methacrylic acid. Those copolymers which contain propylene as a comonomer are also acceptable as long as they are not included in the above-described essential crystalline propylene polymer resin.

Of these olefin resins (Ab), an ethylene polymer resin, a cyclic olefin polymer resin, and a mixture thereof are preferred from the viewpoint of uniform extensibility of the final product.

The "ethylene polymer resin" as used herein means high-density polyethylene, low-density polyethylene, a copolymer of ethylene and 20% by weight or less of another alpha-olefin such as propylene, butane-1 or hexene-1, or a copolymer of ethylene and 25% by weight or less of a polymerizable monomer other than alpha-olefins, such as vinyl acetate, acrylate, methacrylates, acrylic acid or methacrylic acid, having a melt flow rate (MFR) of preferably 0.01 to 200 g/10 min, particularly 0.1 to 100 g/10 min as determined in accordance with ASTM-D1238 at 190° C. under a load of 2.16 kg, a density of preferably 0.89 to 0.97 g/cm³, particularly 0.90 to 0.96 g/cm³ and a crystallinity of generally 35% or more, preferably 40–80%.

The "cyclic olefin polymer resin" as used herein means a polymer of a cyclic olefin represented by the above formula (I), a copolymer of the cyclic olefin and an alpha-olefin, or a hydrogenated product of the cyclic olefin polymer, and can be prepared by a known method (with respect to the addition copolymerization of the cyclic olefin and an alpha-olefin, see, for example, Japanese Laid-Open Patent Publication No. 168708/1985; with respect to the ring-opening polymerization of the cyclic olefin, see, for example, Japanese Laid-Open Patent Publication No. 127728/1983; and with respect to the hydrogenated product of a ring-opened polymer of the cyclic olefin, see, for example, Japanese Laid-Open Patent Publication No. 26024/1985). Of these, an addition copolymer of the cyclic olefin and an alpha-olefin, and a hydrogenated product of the cyclic olefin polymer are preferred from the viewpoints of heat resistance and mechanical strength. Specifically, there can be mentioned an addition copolymer of ethylene and 1,4,5,8-dimethano-1,2, 3,4,4a,5,8,8a-octahydronaphthalene, a hydrogenated product of a ring-opened polymer of 1,4,5,8-dimethano-1,2,3,4, 4a,5,8,8a-octahydronaphthalene, and a hydrogenated product of a ring-opened polymer of 1,4,5,8-dimethano-1, 2,3,4,4a,5,8,8a-octahydronaphthalene and norbornena.

The glass transition temperature (Tg) of the cyclic olefin polymer resin is preferably from 60 to 160° C., more preferably from 70 to 140° C. The melt flow rate (MFR) of the cyclic olefin polymer resin determined in accordance with ASTM-D1238 at 260° C. under a load of 2.16 kg is preferably from 0.1 to 200 g/10 min, more preferably from 1 to 100 g/10 min.

The essential crystalline propylene polymer resin component (Aa) and the optional olefin resin component (Ab) are used in such a proportion that the amount of the former component is from 50 to 100% by weight, preferably from 60 to 100% by weight of the total amount of the two components. When the proportion does not fall within this range, the resulting product shows poor uniform extensibility when it is subjected to forming.

Component (B): Olefin Copolymer Rubber

The olefin copolymer rubber used as the component (B) in the present invention is an olefin copolymer rubber containing 10 to 100% by weight of an olefin-propylene copolymer rubber (Ba) whose propylene content is from 65 to 90% by weight.

Component (Ba): Olefin-Propylene Copolymer Rubber

Since this olefin-propylene copolymer rubber (Ba) has high propylene content, it is highly compatible with the crystalline propylene polymer resin contained in the above-described component (A). For this reason, it can improve the uniform extensibility and emboss retention of the product, which are required when the product is subjected to forming.

Specific examples of the olefin-propylene copolymer rubber (Ba) include a copolymer rubber of propylene, a main component, and another alpha-olefin other than propylene, such as ethylene, butene-1 or hexen-1.

It is noted that the olefin-propylene copolymer rubber (Ba) is a low-crystalline or non-crystalline polymer having a crystallinity of 30% or less. The Mooney viscosity ML1+4 (100° C.) of the olefin-propylene copolymer rubber (Ba), determined in accordance with ASTM-D1646 is preferably from 10 to 200, more preferably from 20 to 150.

Of these, an ethylene-propylene copolymer rubber is preferred. The propylene content of the ethylene-propylene copolymer rubber (Ba) is from 65 to 90% by weight, preferably from 66 to 85% by weight. When the propylene content is less than 65% by weight, the resulting sheet-shaped product will show poor uniform extensibility when it is subjected to secondary forming. On the other hand, when the propylene content is in excess of 90% by weight, rubbery characteristics are lost.

Component (Bb): Olefin Copolymer Rubber

In the present invention, another olefin copolymer rubber (Bb) can be used in addition to the above-described essential rubber component (Ba).

It is noted that the olefin copolymer rubber (Bb) is a low-crystalline or non-crystalline polymer having a crystallinity of 30% or less.

Examples of this optional rubber component (Bb) include copolymer rubbers such as ethylene-propylene copolymer rubber, ethylene-butene-1 copolymer rubber, propylene-butene-1 copolymer rubber, ethylene-propylene-butene-1 copolymer rubber, ethylene-propylene-unconjugated diene terpolymer or multicomponent polymer rubber, and ethylene-butene-1-unconjugated dione terpolymer or multi-component polymer rubber.

Of these, ethylene-propylene copolymer rubber and ethylene-propylene-unconjugated diene terpolymer rubber are preferably used. In particular, ethylene-propylene-unconjugated diene terpolymer rubber in which interaction between rubber domains to be crosslinked by dynamic heat treatment can be expected under a fluid state is most preferable from the view points of emboss retention and uniform extensibility which are required when the product is subjected to forming.

The "unconjugated diene" as used herein means 1,4-hexadiene, dicyclopentadiene, 5-ethylidene-2-norbornene, 1,7-octadiene, 1,9-decadiene, 7-methyl-1,6-octadiene and the like. Of these, dicyclopentadiene and 5-ethylidene-2-norbornene are preferred.

The Mooney viscosity ML1+4 (100° C.) of the optional olefin copolymer rubber (Bb), determined in accordance with ASTM-D1646 is preferably from 10 to 500, more preferably from 20 to 400.

In the case where the olefin copolymer rubber (Bb) is ethylene-propylene copolymer rubber or ethylene-propylene-unconjugated diene terpolymer rubber, the propylene content of the rubber is preferably from 15 to 60% by weight, more preferably from 20 to 55% by weight of the total amount of ethylene and propylene.

The degree of unsaturation of the olefin copolymer rubber (Bb) is preferably 20 or less, more preferably 18 or less when expressed in iodine value.

The essential rubber component (Ba) and the optional rubber component (Bb) are used in such a proportion that the amount of the former component is from 10 to 100% by weight, preferably from 17 to 80% by weight, more preferably from 20 to 60% by weight of the total amount of these two components. When the proportion does not fall within this range, the resulting product shows poor uniform extensibility when it is subjected to forming. When the proportion is within this range, not only the uniform extensibility but also the emboss retention which are required when the product is subjected to forming are improved.

Those copolymer rubbers which are pre-blended with a rubber-softening agent, component (E), which will be described later, can also be used.

In the present invention, in addition to the above components (A) and (B), the following components (C), (D) and (E) can optionally be used. Each of these components can be added to the components (A) and (B) in the preparation of the thermoplastic elastomer by dynamic heat treatment (incorporation in the composition (I)), or can be post-added to the thermoplastic elastomer (incorporation in the composition (II)).

Component (C): Specific Low-Molecular Weight Olefin Polymer

The following component (C) is preferable because it can improve the emboss retention of the product.

The component (C) is a low-molecular weight olefin polymer having a melt flow rate (MFR) of 100 g/10 min or more, as determined in accordance with ASTM-D1238 at 230° C. under a load of 2.16 kg, a melting point of 80° C. or higher and a crystallinity of generally 35% or more, preferably 40–80% (hereinafter referred to as a "specific low-molecular weight olefin polymer").

Examples of the specific low-molecular weight olefin polymer, the component (C), include ethylene homopolymer, a random copolymer of ethylene and an alpha-olefin having 4 or more carbon atoms, propylene homopolymer, a random copolymer of propylene and 10% by weight or less of another alpha-olefin having 2 or more carbon atoms, and a product which is obtained by decomposing one of these polymers and copolymers by heat or by an organic peroxide. Of these, preferable ones are propylene homopolymer, a random copolymer of propylene and 10% by weight or less of at least one alpha-olefin selected from ethylene, butene-1 and hexene-1, and a product which is obtained by the decomposition of such a polymer or copolymer by heat or by an organic peroxide.

The number-average molecular weight of the specific low-molecular weight olefin polymer is generally from 2,000 to 50,000. A number-average molecular weight of 3,000 to 40,000 is preferable from the viewpoints of emboss retention and matte effect. Further, the melt flow rate (MFR) of the specific low-molecular weight olefin polymer, determined in accordance with ASTM-D1238 at 230° C. under a load of 2.16 kg is 100 g/10 min or more, preferably from 150 to 20,000 g/10 min. When the MFR of the polymer is lower than 100 g/10 min, the intended effect of improved emboss retension cannot be sufficiently obtained The melting point of the specific low-molecular weight olefin polymer is 80° C. or higher, preferably from 100 to 170° C., more preferably from 120 to 170° C. when determined by a melting peak temperature as measured with DSC (differential scanning calorimetry). When the melting point of the polymer is lower than 80° C., the effects of the present cannot be sufficiently obtained.

Component (D): Specific Propylene Block Copolymer

The following component (D) is preferable because it enhances the emboss retention of the product but also improves the matte effect.

The component (D) is a propylene block copolymer consisting of the following block (a) and (b) and having a crystallinity of generally 35% or more, preferably 40–80% (hereinafter referred to as a "specific propylene block copolymer"):

block (a): a block containing 90 to 100% by weight of propylene, having a melt flow rate of 50 g/10 min or more as determined at 230° C. under a load of 2.16 kg, selected from the following (a1), (a2) and (a3):
(a1): a propylene homopolymer block,
(a2): a block of a binary random copolymer of propylene with ethylene or with an alpha-olefin having 4 to 12 carbon atoms, and
(a3): a propylene homopolymer block and a block of a binary random copolymer of propylene with ethylene or with the above alpha-olefin; and block (b): a block containing 20 to 100% by weight of ethylene, selected from the following (b1), (b2) and (b3):

(b1): an ethylene homopolymer block, (b2): a block of a binary random copolymer of ethylene with an alpha-olefin having 3 to 12 carbon atoms, and (b3): an ethylene homopolymer block and a block of a binary random copolymer of ethylene with the above alpha-olefin.

The specific propylene block copolymer, the component (D), can be prepared by any of the production methods described in, for instance, Japanese Laid-Open Patent Publications Nos. 61278/1974, 53990/1974, 133393/1976 and 145113/1982.

Thus, the propylene block copolymer (D) can be prepared, for example, by the polymerization technique disclosed in Japanese Laid-Open Patent Publication No. 145113/1982. In this method, a two-step polymerization is conducted which employs a stereospecific polymerization catalyst comprising (a) a solid catalyst containing at least Mg, Ti and Cl, (b) an organoaluminum compound and (c) an electron donor compound having 2–20 carbon atoms and having at least one C-O and/or C-N linkage. The two-stage polymerization, conducted in the presence of the stereospecific polymerization catalyst, comprises a first step of bulk polymerization of a block (a)-forming monomer, i.e., propylene alone or a mixture of propylene with up to 10% by weight of ethylene or a $C_{4-12}$-alpha-olefin, at 65–85° C., and a second step of bulk polymerization of a block (b)-forming monomer, i.e., ethylene alone or a mixture of ethylene with up to 80% by weight of a $C_{3-12}$-alpha-olefin, at 30–65° C. In the instance where block (a3) is formed, the first step of polymerization may be conducted in two stages comprising a first stage of propylene homopolymerization and a second stage of propylene copolymerization with ethylene or a $C_{4-12}$-alpha-olefin. In the instance of the formation of block (b3), the second stage of polymerization is carried out in two stages, the first of which is the homopolymerization of ethylene, and the second stage is the copolymerization of ethylene with a $C_{3-12}$-alpha-olefin.

The melt flow rate (MFR) of the specific propylene block copolymer itself consisting of the above-described block (a) and (b), determined in accordance with ASTM-D1238 at 230° C. under a load of 2.16 kg is preferably more than 20 g/10 min, particularly from 25 to 500 g/10 min.

Further, the melt flow rate (MFR) of the block (a) in the specific propylene block copolymer, determined in accordance with ASTM-D1238 at 230° C. under a load of 2.16 kg is 50 g/10 min or more, preferably from 60 to 20000 g/10 min. When either the MFR of the specific propylene block copolymer itself or that of the block (a) in the copolymer is too low, the effect of improving emboss retention cannot be sufficiently attained.

In particular, a product which is in a favorable matte state can be obtained when the specific propylene block copolymer is one whose alpha-olefin (other than propylene) content is 30% by weight or less of the entire copolymer and in which the proportion of the block (a) to the entire copolymer (the total weight of the block (a) and (b)) is 70 to 95% by weight.

The above-described specific low-molecular weight olefin compound, the component (C), and specific propylene block copolymer, the component (D), can be used either singly or in combination.

Component (E): Rubber-Softening Agent

The rubber-softening agent, the component (E), plays an important role in improving the processability and enhancing the flexibility of the thermoplastic elastomer. The rubber-softening agent is preferably a high-boiling petroleum fraction which is, in general, a mixture of three components of aromatic ring, naphthene ring and paraffin chain. A softening agent in which the number of paraffin-chain carbon atoms is 50% or more of the total number of carbon atoms is called "paraffin type", a softening agent in which the number of naphthene-ring carbon atoms is from 30 to 40% of the total number of carbon atoms is called "naphthene type", and a softening agent in which the number of aromatic-ring carbon atoms is 30% or more of the total number of carbon atoms is called "aromatic type". Of these, a softening agent of paraffin type is preferred. The number-average molecular weight of the softening agent is preferably from 20 to 2,000, more preferably from 300 to 1,600.

When the component (E) is used, it is preferably used as a component of the composition (I), i.e., as a component to be subjected to dynamic heat treatment to produce the thermoplastic elastomer.

Component (F): Olefin Resin or Elastomer

In the present invention, an olefin resin or elastomer, component (F), which has not been subjected to crosslinking treatment can be additionally incorporated as a diluent into a thermoplastic elastomer which is obtained by subjecting the above essential components (A) and (B) and the optional components (C) to (E) to dynamic heat treatment carried out in the presence of an organic peroxide.

The olefin resin or elastomer component which has not been subjected to crosslinking treatment, used as a diluting component may be properly selected from those olefin resins and olefin copolymer rubbers which have already been described in the above items of the components (A) and (B), that is, ethylene, propylene, butane and cyclic olefin polymers.

Those components which are described as preferable in the above items of the components (A) and (B) can be mentioned as preferable components also in the case of this olefin resin or elastomer component as a diluent.

Further, a thermoplastic elastomer which is obtained by subjecting a mixture of an olefin copolymer rubber (one which does not contain the previously-described olefin-propylene copolymer rubber (Ba) component whose propylene content is from 65 to 90% by weight) and a crystalline olefin resin to crosslinking treatment can also be used as this elastomer component for dilution.

Other Optional Components

In the present invention, a variety of resins and elastomers other than the above-described essential or optional components may be incorporated, when necessary. Further, fillers such as glass fiber, talc, calcium carbonate, diatomaceous earth and silica, various additives such as a weathering stabilizer, an antioxidant, an antistatic agent, a flame-retardant, a dispersant and a slip agent, and pigments such as carbon black may also be incorporated, if necessary, Organic Peroxide Either an aromatic peroxide or an aliphatic peroxide can be used as the organic peroxide which is used when the thermoplastic elastomer of the present invention is prepared. A mixture of two or more organic peroxides can also be used. Specific examples of the organic peroxide include 2,5-dimethyl-2,5-di(tert-butylperoxy)-hexane, 2,5-dimethyl-2,5-di(tert-butylperoxy)hexyne-3, tert-butylperoxybenzoate, dicumyl peroxide, 2,5-dimethyl-2,5-di(benzoylperoxy)hexane, tert-butylcumyl peroxide, diisopropyl benzohydroperoxide, benzoyl peroxide and di-tert-butyl peroxide.

[II] BLEND RATIO

The blend ratio of the components (A) and (B) in the present invention is as follows: the component (A) is from 10 to 75% by weight and the component (B) is from 90 to 25% by weight of the total of the components (A) and (B); preferably, the component (A) is from 15 to 50% by weight and the component (B) is from 85 to 50% by weight; and more preferably, the component (A) is from 15 to 45% by weight and the component (b) is from 85 to 55% by weight. When the amount of the component (A) is in excess of 75% by weight, the hardness of the resulting product becomes too high, so that the flexible texture of the product is impaired. On the other hand, when the amount of the component (A) is less than 10% by weight, the resulting product is poor in formability and mechanical strength.

The amount of the specific low-molecular weight olefin compound, the optional component (C), is preferably from 10 to 250 parts by weight, more preferably from 15 to 200 parts by weight for 100 parts by weight of the component (A). When the amount of the component (C) is in excess of 250 parts by weight, the resulting product shows poor uniform extensibility when it is subjected to forming. On the other hand, when the amount of the component (C) is less than 10 parts by weight, the product shows poor emboss retention when it is subjected to forming.

The amount of the specific propylene block copolymer, the optional component (D), is preferably from 10 to 500 parts by weight, more preferably from 15 to 400 parts by weight for 100 parts by weight of the component (A). When the amount of the component (D) is in excess of 500 parts by weight, the resulting product shows poor uniform extensibility when subjected to forming. On the other hand, when the amount of the component (D) is less than 10 parts by weight, the emboss retention of the product is poor.

When the components (C) and (D) are used in combination, the total amount of these two components is preferably from 10 to 500 parts by weight, more preferably from 15 to 400 parts by weight for 100 parts by weight of the component (A) in the light of uniform extensibility and emboss retention of the resulting product.

In the above case, the ratio of the component (C) to the component (D) is preferably from 10:90 to 50:50 from the viewpoint of the improvement in matte state.

The amount of the rubber-softening agent, the optional component (E), is preferably from 10 to 200 parts by weight, more preferably from 15 to 100 parts by weight for 100 parts by weight of the component (B). When the component (E) is used in a larger amount than 200 parts by weight, it tends to readily bleed out from the thermoplastic elastomer obtained. On the other hand, when the amount of the component (E) is less than 10 parts by weight, there may be a case where the processability and flexibility of the resulting product are impaired.

The amount of the olefin resin or elastomer as a diluent, the optional component (F), is from 10 to 300 parts by weight, preferably from 10 to 200 parts by weight, more preferably from 10 to 150 parts by weight for 100 parts by weight of the total of the components (A) and (B). When the amount of the component (F) is in excess of 300 parts by weight, it is difficult to obtain the desired emboss retention of the resulting product.

The amount of the organic peroxide is generally from 0.01 to 10 parts by weight, preferably from 0.1 to 5 parts by weight for 100 parts by weight of the total of the components (A) and (B) and the optional components (C) to (E). It is practically determined in consideration of the degree of crosslinking.

[III] DYNAMIC HEAT TREATMENT—PREPARATION OF THERMOPLASTIC ELASTOMER

The thermoplastic elastomer of the present invention can be prepared by subjecting the above-described components (A) and (B), and, if necessary, the optional components (C), (D) and (E) to dynamic heat treatment which is carried out in the presence of the organic peroxide.

The "dynamic heat treatment" as used herein means that the components which are in a molten state are kneaded by means of a Banbury mixer, an extruder, a kneader, a mixing roll or the like. In general, the components are kneaded at a temperature of 150 to 350° C., preferably 160 to 300° C. for 1 to 30 minutes, preferably 1 to 20 minutes.

The degree of crosslinking (wt. %) of the component (B) crosslinked by this dynamic heat treatment can be determined in the following manner: 1 g of the resulting thermoplastic elastomer is placed in a 80-mesh wire net bag, and extracted with boiling xylene for 10 hours by using a Soxhlet extractor. The solid matter remaining in the wire net bag is weighed. The degree of crosslinking is determined by first obtaining a value by dividing the weight of the solid matter by the amount of the component (B) contained in 1 g of the sample, and multiplying the thus-obtained value by 100. According to the present invention, the degree of crosslinking of the component (B) is preferably from 10 to 99% by weight, more preferably from 15 to 95% by weight, most preferably from 20 to 90% by weight. When the degree of crosslinking is too low, some problems are caused; for example, the resulting elastomer has lowered mechanical strength and heat resistance, and a sheet obtained from this elastomer by molding has excessively high gloss.

In the preparation of the thermoplastic elastomer of the present invention, a crosslinking auxiliary agent can be used together with the organic peroxide, if necessary. Examples of the crosslinking auxiliary agent include (meth)acrylic acid polyfunctional monomers such as ethylene glycol dimethacrylate, polyethylene glycol dimethacrylate, trimethylol propane triacrylate and trimethylol propane trimethacrylate, divinylbenzene and liquid polybutadiene. The amount of the crosslinking auxiliary agent is generally from 0 to 10 parts by weight, usually from 0.1 to 5 parts by weight for 100 parts by weight of the total of the components (A) and (B) and the optional components (C) to (E). The amount of the crosslinking auxiliary agent is practically determined in consideration of the degree of crosslinking.

[IV] ADDITION OF OPTIONAL COMPONENTS TO THE ELASTOMER

When the above optional components (C) to (F) are post-added to the above thermoplastic elastomer obtained by the dynamic heat treatment, the thermoplastic elastomer and the optional component(s) may either be dry-blended in the form of pellets or powder or kneaded by the use of a Banbury mixer, an extruder, a kneader, a mixing roll or the like.

The kneading is conducted at a temperature of generally from 150 to 350° C., preferably from 160 to 300° C. for 1 to 30 minutes, preferably for 1 to 20 minutes.

[V] PRODUCTION OF SHEET-SHAPED PRODUCT (1) Molding

The above described thermoplastic elastomer, which may be blended with the optional components, is molded into a sheet.

In general, the thermoplastic elastomer is molded into a sheet by a conventional method, using a calender roll, an extruder fitted with a T die or a ring die, or a press molding machine.

In order to provide an embossed pattern, one of the following methods can be employed: a method in which a molded sheet in a molten or half-molten state, extruded from a calender roll, an extruder fitted with a T die, or the like is allowed to pass between an embossing roll and a pressure roll such as a rubber roll; a method in which a molded sheet once taken off is heated again by means of a heating drum or an infrared heater, and then allowed to pass between an embossing roll and a pressure roll such as a rubber roll; and a method in which a molded sheet is intermittently pressed by using a metal mold which is provided with an embossed pattern. Further, a method can also be employed in which embossing is conducted simultaneously with secondary forming by means of vacuum forming, using a female metal mold provided with an embossed pattern Furthermore, such a shaped sheet that is obtained by laminating a foamed material onto the above-obtained embossed sheet, and subjecting the laminate to female draw forming or the like is also included in the sheet-shaped product of the present invention.

It is noted that the "embossed pattern" as used herein means a leather-like or geometrical pattern provided on the surface of a sheet by means of embossing.

(2) Sheet-Shaped Product

The sheet herein is one having a thickness of approximately 0.05 to 10 mm.

The sheet may be laminated with a foamed material, woven fabric, nonwoven fabric, cotton cloth, paper or the like. Further, it is also possible to provide a coat layer on at least one surface of the sheet.

Furthermore, such a product that is obtained by subjecting the above sheet or laminate to forming by means of vacuum forming, pressure forming or the like is also included in the sheet-shaped product of the present invention.

(3) Intended Use

The sheet-shaped product of the present invention, which is provided on the surface with a leather-like or geometrical embossed pattern, can be advantageously used as a skin material for interior finish, in particular, as a sheet-shaped skin material for interior automotive trim. Specifically, it can be used as a skin material for an instrument panel, a door trim, a console box, a ceiling sheet, a steering wheel pad, and a seat.

The present invention will now be explained more specifically by referring to the following Examples. The starting materials used and the evaluation methods adopted in the following examples are as follows:

[I] STARTING MATERIALS

Component (A)

Component (Aa)

PP (1): Polypropylene (crystallinity=60%) having an MFR (determined at 230° C. under a load of 2.16 kg) of 0.7 g/10 min, and a number-average molecular weight of 120,000.

PP (2): Propylene-ethylene block copolymer (crystallinity=51%) containing 30% by weight of ethylene and 15% by weight of a fraction soluble in xylene at normal temperature, having an MFR (determined at 230° C. under a load of 2.16 kg) of 20 g/10 min, and a number-average molecular weight of 48,000.

PP (3): Propylene-ethylene random copolymer (crystallinity=57%) containing 4% by weight of ethylene, having an MFR (determined at 230° C. under a load of 2.16 kg) of 10 g/10 min, and a number-average molecular weight of 60,000.

Component (Ab)

PE (1): Ethylene-butene copolymer containing 8.3% by weight of butene, having a density of 0.92 g/cm$^3$, an MFR (determined at 230° C. under a load of 2.16 kg) of 16 g/10 min and a crystallinity of 48%.

Cyclic olefin polymer resin: "Apel 6509" manufactured by Mitsui Petrochemical Industries, Ltd., a copolymer resin of ethylene and a cyclic olefin, having a glass transition temperature of 80° C., an MFR (determined in accordance with ASTM-D1238 at 260° C. under a load of 2.16 kg) of 40 g/10 min and a density of 1.02 g/cm$^3$.

Component (B)

Component (Ba)

EPM (1): Ethylene-propylene copolymer rubber (crystallinity=5% or lower) having a Mooney viscosity ML1+4 (100° C.) of 70, containing 70% by weight of propylene.

EPM (2): Ethylene-propylene copolymer rubber (crystallinity=5% or lower) having a Mooney viscosity ML1+4 (100° C.) of 70, containing 27% by weight of propylene.

EPM (3): Ethylene-propylene copolymer rubber (crystallinity=5% or lower) having a Mooney viscosity ML1+4 (100° C.) of 40, containing 49% by weight of propylene.

Component (Bb)

EPDM (1): Ethylene/propylene/5-ethylidene-2-norbornene terpolymer rubber (crystallinity=5% or lower) containing 43% of the below-described paraffin oil (component (E)), having a Mooney viscosity ML1+8 (120° C.) of 62 (equivalent to 86 when converted to ML1+4 (100° C.)), a propylene content of 28% by weight of the total of ethylene and propylene, and an iodine value of 15.

EPDM (2): Ethylene/propylene/5-ethylidene-2-norbornene terpolymer rubber (crystallinity=5% or lower) having a Mooney viscosity ML1+4 (100° C.) of 88, a propylene content of 28% by weight of the total of ethylene and propylene, and an iodine value of 15.

<Component (C)>

C (1): Low-molecular weight propylene homopolymer having an MFR (determined at 230° C. under a load of 2.16 kg) of 700 g/10 min (number-average molecular weight=15,000), a melting peak temperature (melting point) of 160° C. as determined by DSC, and a crystallinity of 69%.

C (2): Low-molecular weight propylene polymer having a crystallinity of 63% and a melting peak temperature (melting point) of 146° C. as determined by DSC, whose MFR is adjusted to 4700 g/10 min (number-average molecular weight=7500), obtained by extruding, in the presence of an organic peroxide, an ethylene-propylene random copolymer having an MFR (determined at 230° C. under a load of 2.16 kg) of 10 g/10 min, and containing 2.5% by weight of ethylene.

Paraffin wax: "Highmic 2095" manufactured by Nippon Seiro Co., Ltd., having a melting peak temperature (melting point) of 80° C. as determined by DSC, a number-average molecular weight of 700, and a density of 0.935 g/cm$^3$.

Component (D)

D (1): Propylene block copolymer consisting of a propylene homopolymer block (a) and an ethylene-propylene random copolymer block (b), having the following characteristics:

the crystallinity of the propylene block copolymer itself is 56%;

the MFR (determined at 230° C. under a load of 2.16 kg) of the propylene block copolymer itself is 60 g/10 min;

the ethylene content of the propylene block copolymer is 6% by weight of the entire copolymer;

the MFR (determined at 230° C. under a load of 2.16 kg) of the block (a) is 150 g/10 min;

the block (a) constitutes 90% by weight of the propylene block copolymer; and the ethylene content of the block (b) is 40% by weight.

D (2): Propylene block copolymer consisting of a propylene-ethylene random copolymer block (a) and an ethylene-propylene random copolymer block (b), having the following characteristics:

the crystallinity of the propylene block copolymer itself is 50%;

the MFR (determined at 230° C. under a load of 2.16 kg) of the propylene block copolymer itself is 33 g/10 min;

the ethylene content of the propylene block copolymer is 5.8% by weight of the entire copolymer;

the MFR (determined at 230° C. under a load of 2.16 kg) of the block (a) is 80 g/10 min;

the propylene content of the block (a) is 98.5% by weight (ethylene content=1.5% by weight);

the block (a) constitutes 89% by weight of the propylene block copolymer; and the ethylene content of the block (b) is 60% by weight.

Component (E):

Paraffin oil having an number-average molecular weight of 746, containing no cyclic component ("DIANA PROCESS OIL PW-380" manufactured by Idemitsu Kosan, Co.)

Component (F)

PP (4): Polypropylene (crystallinity=62%) having an MFR (determined at 230° C. under a load of 2.16 kg) of 17 g/10 mln and a number-avarage molecular weight of 53,000.

PE (2); Ethylene-butene copolymer (crystallinity=48%) containing 6.8% by weight of butene, having a density of 0.92 g/cm$^3$ and an MFR (determined at 230° C. under a load of 2.16 kg) of 2 g/10 min.

Cyclic olefin polymer resin: "Apel 6013" manufactured by Mitsui Petrochemical Industries, Ltd., a copolymer resin of ethylene and a cyclic olefin, having a glass transition temperature of 125° C. and an MFR (determined in accordance with ASTM-D1238 at 260° C. under a load of 2.16 kg) of 15 g/10 min.

Thermoplastic elastomer: Elastomer obtained by subjecting polypropylene and ethylene/propylene/ 5-ethylidene-2-norbornene terpolymer rubber (propylene content 28% by weight) to dynamic heat treatment ("Thermolan 3652N" manufactured by Mitubishi Petrochemical Co., Ltd.). organic peroxide: "Kayahexa AD" manufactured by Kayaku-Nuri Kabushiki Kaisha (2,5-dimethyl-2,5-di(tert-butylperoxy)hexane). Crosslinking auxiliary agent: Divinylbenzene

[II] EVALUATION METHODS (1) Hardness: Determined in accordance with JIS K-6301 (Standard A). The pellets obtained in the "Preparation of Thermoplastic Elastomer" were compression-molded into a thickness of 2 mm, and three pieces of this sheet were superposed to obtain a test piece.

(2) Emboss retention after vacuum forming

Rz retention (%): The depth of the embossed pattern of a sheet on the side of the below-described quadrangular frustum was measured at ten points before and after the below-described vacuum forming using a surface-roughness measuring device ("Surfcom 570A") manufactured by Tokyo Seimitsu Co., Ltd. The Rz retention (%) was determined as the percentage of the average roughness (depth) after the vacuum forming to the average roughness before the vacuum forming.

In Tables 1 and 2, "⊚" denotes the Rz retention of 50% or more; "○" denotes the Rz retention of 40% or more and less than 50%; "Δ" denotes the Rz retention of 35% or more and less than 40%; and "X" denotes the Rz retention of less than 35%.

(3) Break: "○" denotes that no break was found in a sheet in the course of the below-described vacuum forming; and "X" denotes that break was found in a sheet in the course of the vacuum forming.

(4) Matte state: The gloss (%) of a sheet was measured in accordance with JIS Z-8741 after the below-described vacuum forming. The measurement was conducted on the side of the sheet which had been contacted with the below-described quadrangular frustum. "⊚" denotes that the gloss is less than 1.7%; "○" denotes that the gloss is 1.7% or more and 2.34 or less, and "X" denotes that the gloss is more than 2.3%.

It is noted that the matte state is better when the value is lower.

[III] EXPERIMENTAL EXAMPLES

Examples 1 to 7 and 12 to 20, and Comparative Examples 1 to 8 (Preparation of Thermoplastic Elastomer)

(1st Step)

All of the components except the organic peroxide and the crosslinking auxiliary agent were placed in a 4 liter Banbury mixer in the respective amounts shown in Tables 1 and 2, and kneaded at 170° C. for 5 minutes. The mixture was formed into a sheet by means of a roller, which was then cut with a sheet cutter to obtain pellets.

In Examples 1 to 7, 12 to 18, and Comparative Examples 1 to 3 and 6 to 8 shown in Tables 1 and 2, the weight ratio of the total amount of the component (A) and the optional component (C) and/or component (D) to the total amount of the component (B) and the optional component (E), that is, the weight ratio of the resin components to the rubber component with the rubber-softening agent was fixed to 3:7.

(2nd Step)

The pellets obtained in the 1st step were blended with the organic peroxide and the crosslinking auxiliary agent in the respective amounts shown in Tables 1 and 2 in a Henschel mixer, followed by kneading in a twin-screw extruder ("PCM 45" manufactured by Ikegai Corp., 200° C., 230 rpm) for 40 seconds, thereby to obtain a thermoplastic elastomer.

(Preparation of Sheet)

The above-obtained thermoplastic elastomer was extruded at 220° C. through an extruder ("45 mmφ Small-Size T-Die Sheet Forming Machine" manufactured by Musashino Kikai Kabushiki Kalsha) having a diameter of 45 mm and an L/D flighted screw. The extruded thermoplastic elastomer was allowed to pass between an embossing roll (30° C.) and a rubber pressure roll, and taken off at a speed of 2 m/min. Thus, a sheet having a thickness of 0.6 mm, provided with an embossed pattern with an average pattern depth of 100 μm was obtained.

This sheet was further subjected to corona treatment to make the wetting index thereof to 40 dyne/cm. Thereafter, an olefin primer ("Highcoap U L-4001" manufactured by Tokushu Shikiryo Coloring Mfg. Co., Ltd.) and a urethane top coat ("Highcoap U EU-684" manufactured by Tokushu Shikiryo Coloring Mfg. Co., Ltd.) were spray-coated onto the sheet in wet amounts of 40 g/m² and 70 g/m2, respectively.

(Vacuum Forming)

The above-obtained sheet was heated by means of an infrared heater until the surface temperature thereof reached 160° C., and then subjected to male draw forming, using a male metal die with a quadrangular frustum having a bottom face area of 130 cm², a top face area of 40 cm² and a height of 5.5 cm. "Vacuum Forming Machine FCP-4APA-W-30-L" manufactured by Kabushiki Kaisha Asano Kenkyujo was.

(Evaluation)

The formed product thus obtained was evaluated in accordance with the above-described evaluation methods.

Examples 8 to 11

The components were blended in the respective amounts shown in Table 1, and a thermoplastic elastomer was prepared in the same manner as in the above examples. Thereafter, the procedure of the above examples was repeated except that the thermoplastic elastomer and the olefin resin or elastomer as a diluent, the component (F), in the amount shown in Table 1 were blended, and then kneaded in a twin-screw extruder ("PCM45" manufactured by Ikegai Corp., 200° C., 230 rpm).

TABLE 1

| Formulation (parts by weight) | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Component (A) | | | | | | | | | | | |
| Component (Aa) PP(I) | 30 | 36 | 27 | 36 | 24 | — | 24 | 26 | 26 | 26 | 36 |
| PP(2) | — | — | — | — | — | 36 | — | — | — | — | — |
| PP(3) | — | — | — | — | — | — | — | — | — | — | — |
| Component (Ab) Cyclic olefin polymer resin | — | — | — | — | — | 12 | — | — | — | — | — |
| PE(1) | — | — | — | 12 | — | — | — | — | — | — | — |
| Component (B) | | | | | | | | | | | |
| Compoment (Ba) EPM(1) | 70 | 36 | 41 | 36 | 36 | 36 | 36 | 38 | 38 | 38 | 36 |
| EPM(2) | — | — | — | — | — | — | — | — | — | — | — |
| Component (Bb) EPDM(1) | — | 28 | 32 | — | 28 | 28 | 28 | 36 | 36 | 36 | 28 |
| EPDM(2) | — | — | — | 28 | — | — | — | — | — | — | — |
| Component (C)*1 C(1) | — | — | — | — | — | — | — | — | — | — | — |
| C(2) | — | — | — | — | — | — | — | — | — | — | — |
| Component (D)*1 D(1) | — | — | — | — | — | — | — | — | — | — | — |
| D(2) | — | — | — | — | — | — | — | — | — | — | — |
| Component (E)*2 (2) | — | (32) | (32) | 32 | (32) | (32) | (32) | (38) | (38) | (38) | (32) |
| Crosslinking auxiliary agent*3 | 0.4 | 0.4 | 0.4 | 0.4 | 0.4 | 0.4 | 0.4 | 0.4 | 0.4 | 0.4 | 0.4 |
| Organic peroxide*3 | 0.3 | 0.3 | 0.3 | 0.3 | 0.3 | 0.3 | 0.3 | 0.3 | 0.3 | 0.3 | 0.3 |
| Degree of Crosslinking of Component (B) (wt. %) | 27 | 55 | 58 | 62 | 82 | 75 | 75 | 74 | 74 | 74 | 74 |
| Component (F) PP(4) | — | — | — | — | — | — | — | 30 | — | — | — |
| PE(2) | — | — | — | — | — | — | — | — | 30 | — | — |
| Cyclic olefin polymer resin | — | — | — | — | — | — | — | — | — | 10 | — |
| Thermoplastic Elastomer | — | — | — | — | — | — | — | — | — | — | 100 |
| Properties | | | | | | | | | | | |
| Hardness | 85 | 88 | 87 | 87 | 89 | 88 | 88 | 92 | 85 | 90 | 79 |
| Emboss retention after vacuum forming | ○ | ◉ | ◉ | ◉ | ○ | ◉ | ◉ | ◉ | ○ | ◉ | ○ |
| Rz Retention (%) | 50 | 54 | 51 | 48 | 53 | 52 | 52 | 45 | 52 | 46 | |
| Break at vacuum forming | ○ | ○ | ○ | ○ | ○ | ○ | ○ | ○ | ○ | ○ | ○ |
| Matte state | ○ | ○ | ○ | ○ | ◉ | ◉ | ○ | ○ | ○ | ○ | ○ |
| Gloss (%) | 2.0 | 1.9 | 2.2 | 2.2 | 0.9 | 1.2 | 2.3 | 2.0 | 2.3 | 2.3 | 1.7 |

| Formulation (parts by weight) | Example 12 | Example 13 | Example 14 | Example 15 | Example 16 | Example 17 | Example 18 | Example 19 | Example 20 |
|---|---|---|---|---|---|---|---|---|---|
| Component (A) | | | | | | | | | |
| Component (Aa) PP(I) | 16 | 20 | — | 27 | 33 | 18 | 18 | 30 | 30 |
| PP(2) | — | — | — | — | — | — | — | — | — |
| PP(3) | — | — | 14 | — | — | — | — | — | — |
| Component (Ab) Cyclic olefin polymer resin | — | — | — | — | — | — | — | — | — |
| PE(1) | — | — | — | — | — | — | — | — | — |
| Component (B) | | | | | | | | | |
| Compoment (Ba) EPM(1) | 48 | 65 | 70 | 41 | 55 | 82 | 82 | 70 | 70 |
| EPM(2) | — | — | — | — | — | — | — | — | — |
| Component (Bb) EPDM(1) | 36 | 15 | 16 | 32 | 12 | — | — | — | — |
| EPDM(2) | — | — | — | — | — | — | — | — | — |
| Component (C)*1 C(1) | — | 100 | — | — | — | 100 | — | 30 | — |
| C(2) | — | — | — | 50 | — | — | — | — | — |
| Component (D)*1 D(1) | 200 | — | — | — | — | — | 100 | — | 30 |
| D(2) | — | — | 200 | — | — | — | — | — | — |
| Component (E)*2 (2) | (32) | (14) | (14) | (32) | (14) | — | — | — | — |
| Crosslinking auxiliary agent*3 | 0.4 | 0.4 | 0.4 | 0.4 | 0.4 | 0.4 | 0.4 | 004 | 0.4 |
| Organic peroxide*3 | 0.3 | 0.3 | 0.3 | 0.3 | 0.3 | 0.3 | 0.3 | 0.3 | 0.3 |

TABLE 1-continued

| | | | | | | | | | |
|---|---|---|---|---|---|---|---|---|---|
| Degree of Crosslinking of Component (B) (wt. %) | 41 | 28 | 33 | 38 | 44 | 25 | 30 | 22 | 27 |
| Component (F) PP(4) | — | — | — | — | — | — | — | — | — |
| PE(2) | — | — | — | — | — | — | — | — | — |
| Cyclic olefin polymer resin | — | — | — | — | — | — | — | — | — |
| Thermoplastic Elastomer | — | — | — | — | — | — | — | — | — |
| Properties | | | | | | | | | |
| Hardness | 89 | 88 | 88 | 89 | 86 | 86 | 86 | 90 | 90 |
| Emboss retention after vacuum forming | ⊚ | ⊚ | ⊚ | ⊚ | ○ | ○ | ○ | ○ | ○ |
| Rz Retention (%) | 54 | 50 | 50 | 51 | 41 | 43 | 42 | 42 | 42 |
| Break at vacuum forming | ○ | ○ | ○ | ○ | ○ | ○ | ○ | ○ | ○ |
| Matte state | ⊚ | ○ | ⊚ | ○ | ○ | ○ | ○ | ○ | ○ |
| Gloss (%) | 1.4 | 1.8 | 1.5 | 2.3 | 1.7 | 2.2 | 1.7 | 2.3 | 1.8 |

Note: the parenthesized amount of Component (E) is added to EPDM (1) in advance.
*1: Amount (parts by weight) for 100 parts by weight of Component (A).
*2: Amount (parts by weight) for 100 parts by weight of Component (B).
*3: Amount (parts by weight) for 100 parts by weight of the total amount of Components (A), (B), (C), (D) and (E).

TABLE 2

| Formulation (parts by weight) | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|
| Component (A) | | | | | | | | |
| Component (Aa) PP(I) | 30 | 36 | 42 | 5 | 76 | 36 | 27 | 27 |
| PP(2) | — | — | — | — | — | — | — | — |
| PP(3) | — | — | — | — | — | — | — | — |
| Component (Ab) Cyclic olefin polymer resin | — | — | — | — | — | — | — | — |
| PE(1) | — | — | — | — | — | — | — | — |
| Component (B) | | | | | | | | |
| Compoment (Ba) EPM(1) | — | — | 3 | 95 | — | — | 41 | 41 |
| EPM(2) | 70 | 36 | — | — | — | — | — | — |
| Component (Bb) EPDM(1) | — | — | — | — | — | 36 | — | — |
| EPDM(2) | — | 28 | 55 | — | 24 | 28 | 32 | 32 |
| Component (C)*1 C(1) | — | — | — | — | — | — | — | — |
| C(2) | — | — | — | — | — | — | — | — |
| Paraffin wax | — | — | — | — | — | — | 50 | — |
| Component (D)*1 D(1) | — | — | — | — | — | — | — | — |
| D(2) | — | — | — | — | — | — | — | — |
| Component (E)*2 (2) | — | (32) | (71) | — | (75) | (32) | (32) | (32) |
| Crosslinking auxiliary agent*3 | 0.4 | 0.4 | 0.4 | 0.4 | 0.4 | 0.4 | 0.4 | Phenolic resin crosslinking agent 1.7 Crosslinking-promoting agent (1) 0.7 |
| Organic peroxide*3 | 0.3 | 0.3 | 0.3 | 0.3 | 0.3 | 0.3 | 0.3 | Crosslinking-promoting agent (2) 0.7 |
| Degree of Crosslinking of Component (B) (wt. %) | 72 | 78 | 88 | 45 | 9 | 63 | 57 | 99 |
| Component (F) PP(4) | — | — | — | — | — | — | — | — |
| PE(2) | — | — | — | — | — | — | — | — |
| Cyclic olefin polymer resin | — | — | — | — | — | — | — | — |
| Thermoplastic Elastomer | — | — | — | — | — | — | — | — |
| Properties | | | | | | | | |
| Hardness | 83 | 88 | 88 | Impossible to conduct sheeting | 97 not soft | 88 | 88 | 88 |
| Emboss retention after vacuum forming | X | Δ | ○ | | ○ | Δ | Δ | Δ |
| Rz Retention (%) | 30 | 35 | 51 | | 40 | 36 | 39 | 37 |
| Break at vacuum forming | ○ | X | X | | ○ | X | X | X |
| Matte state | ⊚ | ⊚ | ⊚ | | X | ○ | X | ○ |
| Gloss (%) | 1.5 | 1.4 | 1.4 | | 10.2 | 2.3 | 4.6 | 2.3 |

(Phenolic resin crosslinking agent: dimethylol-P-octyl-phenol formaldehyde resin
(Crosslinking-promoting agent (1): stannous chloride
Crosslinkin-promoting agent (2): zinc oxide
Note: the parenthesized amount of Component (E) is added to EPDM (1) in advance.
*1: Amount (parts by weight) for 100 parts by weight of Component (A).
*2: Amount (parts by weight) for 100 parts by weight of Component (B).
*3: Amount (parts by weight) for 100 parts by weight of the total amount of Components (A), (B), (C), (D) and (E).

What is claimed is:

1. A sheet-shaped product of a thermoplastic elastomer provided with an embossed pattern on the surface thereof and having a surface roughness retention Rz of at least 40% after vacuum forming at a surface temperature of 160° C., comprising:

as a base material, a composition (II) comprising a thermoplastic elastomer, said elastomer being obtained by subjecting a composition (I) comprising the following components (A) and (B) to dynamic heat treatment carried out in the presence of an organic peroxide;

component (A): from 10–75% by weight of an olefin resin containing 50–100% by weight of a crystalline propylene polymer resin having a crystallinity of from 40–80%, as determined by X-ray diffraction, and component (B): from 90–25% by weight of an olefin copolymer rubber containing 10–100% by weight of an olefin-propylene copolymer rubber (Ba) whose propylene content is from 65–90% by weight.

2. The sheet-shaped product according to claim 1, wherein the olefin resin other than the crystalline propylene polymer resin present in component (A) is an ethylene polymer resin or a cyclic olefin resin.

3. The sheet-shaped product according to claim 1, wherein the olefin-propylene copolymer rubber (Ba) present in component (B) is an ethylene-propylene copolymer rubber.

4. The sheet-shaped product according to claim 1, wherein the olefin-propylene copolymer rubber (Ba) present in component (B) has a Mooney viscosity $ML_{1+4}(100°\,C.)$ of 10–200.

5. The sheet-shaped product according to claim 1, wherein the olefin-propylene copolymer rubber (Ba) is a non-crystalline or low-crystalline polymer having a crystallinity of 30% or less, as determined by X-ray diffraction.

6. The sheet-shaped product according to claim 1, wherein said olefin-propylene copolymer rubber is an ethylene-propylene copolymer rubber (Ba) whose propylene content ranges from 66–85% by weight.

7. The sheet-shaped product according to claim 1, wherein the content of olefin-propylene copolymer rubber (Ba) in component (B) ranges from 17–80%.

8. The sheet-shaped product according to claim 1, wherein component (B) comprises not greater than 90% by weight of an olefin copolymer rubber (Bb) which is different from component (Ba) and which is non-crystalline or has a crystallinity of not greater than 30%, as determined by X-ray diffraction, and a Mooney viscosity $ML_{1+4}(100°\,C.)$ ranging from 10–500.

9. The sheet-shaped product according to claim 8, wherein said rubber component (Bb) is a member selected from the group consisting of ethylene-propylene copolymer rubber whose propylene content ranges from 15–60% by weight, ethylene-butene-1 copolymer rubber, propylene-butene-1 copolymer rubber, ethylene-propylene-butene-1 terpolymer rubber, ethylene-propylene-nonconjugated diene terpolymer and ethylene-butene-1-nonconjugated diene terpolymer.

10. The sheet-shaped product according to claim 9, wherein said propylene content of component (Bb) ranges from 20–55% by weight.

11. The sheet-shaped product according to claim 1, wherein the composition (I) further comprises at least one of the following components (C), (D) or (E):

component (C): 10–250 parts by weight, based on 100 parts by weight of component (A), of a low-molecular weight olefin polymer having a melt flow rate of 100 g/10 min or more as determined at 230° C. under a load of 2.16 kg, and a melting point of 80° C. or higher, component (D): 10–500 parts by weight, based on 100 parts by weight of component (A), of a propylene polymer composition consisting of the following components (a) and (b):

component (a): a component containing 90–100% by weight of propylene units, having a melt flow rate of 50 g/10 min or more, as determined at 230° C. under a load of 2.16 kg, selected from the group consisting of (a1), (a2) and (a3):

(a1): a propylene homopolymer component (a2): a component of binary random copolymer of propylene with ethylene or with an alpha-olefin having 4–12 carbon atoms, and (a3): a propylene homopolymer component and a component of a binary random copolymer of propylene with ethylene or with an alpha-olefin having 4–12 carbon atoms; and component (b): a component containing 20–100% by weight of ethylene units, selected from the group consisting of (b1), (b2) and (b3):

(b1): an ethylene homopolymer component, (b2): a component of binary random copolymer of ethylene with an alpha-olefin having 3–12 carbon atoms, and (b3): an ethylene homopolymer component and a component of a binary random copolymer of ethylene with an alpha-olefin having 3–12 carbon atoms said composition being obtained by a sequential polymerization process, conducted in the presence of a stereoregular catalyst, comprising;

(i) polymerizing a component (a)-forming monomer(s), and (ii) polymerizing a component (b)-forming monomer(s) in the presence of the polymer of step (i), or component (E): 10–200 parts by weight, based on 100 parts by weight of polymer (B), of a rubber-softening agent.

12. The sheet-shaped product according to claim 1, wherein the composition (II) further comprises at least one of the following components (C), (D) or (E):

component (C): 10–250 parts by weight, based on 100 parts by weight of component (A), of a low-molecular weight olefin polymer having a melt flow rate of 100 g/1 0 min or more as determined at 230° C. under a load of 2.16 kg, and a melting point of 80° C. or higher, component (D): 10–500 parts by weight, based on 100 parts by weight of component (A), of a propylene polymer composition consisting of the following components (a) and (b):

component (a): a component containing 90–100% by weight of propylene units, having a melt flow rate of 50 g/10 min or more, as determined at 230° C. under a load of 2.16 kg, selected from the group consisting of (a1), (a2) and (a3):

(a1): a propylene homopolymer component, (a2): a component of binary random copolymer of propylene with ethylene or with an alpha-olefin having 4–12 carbon atoms, and (a3): a propylene homopolymer component and a component of a binary random copolymer of propylene with ethylene or with an alpha-olefin having 4–12 carbon atoms; and component (b): a component containing 20–100% by weight of ethylene units, selected from the group consisting of (b1), (b2) and (b3):

(b1): an ethylene homopolymer component, (b2): a component of binary random copolymer of ethylene with an alpha-olefin having 3–12 carbon atoms, and (b3): an ethylene homopolymer component and a component of a binary random copolymer of ethylene with an alpha-olefin having 3–12 carbon atoms said composition being obtained by a sequential polymerization process, conducted in the presence of a stereoregular catalyst, comprising;
  (i) polymerizing a component (a)-forming monomer(s), and
  (ii) polymerizing a component (b)-forming monomer(s) in the presence of the polymer of step (i), or component (E): 10–200 parts by weight, based on 100 parts by weight of polymer (B), of a rubber-softening agent.

13. A sheet-shaped product of a thermoplastic elastomer provided with an embossed pattern on the surface thereof, comprising, as a base material, a composition (II) comprising a thermoplastic elastomer, said elastomer being obtained by subjecting a composition (I) comprising the following components (A), (Ba), (Bb), (Cl) and (E) to dynamic heat treatment carried out in the presence of an organic peroxide:

component (A): 27 parts by weight of polypropylene having an MFR of 0.7 g/10 min, measured as set forth in ASTM D1238 at 230° C. under a load of 2.16 kg, a number average molecular weight of 120,000 and a crystallinity of 60%, as determined by X-ray diffraction;

component (Ba): 41 parts by weight of ethylene-propylene copolymer having a 70% by weight propylene content and a Mooney viscosity $ML_{1+4}(100° C.)$ of 70;

component (Bb): 32 parts by weight of ethylene-propylene-5-ethylidene-2-norbornene terpolymer rubber having a propylene content of 28% of the total amount of ethylene and propylene and having an iodine value of 15;

component (C1): 50 parts by weight of propylene homopolymer having an MFR of 700 g/10 min, measured as set forth in ASTM D1238 at 230° C. under a load of 2.16 kg, a melting peak temperature of 160° C. and a crystallinity of 69%, as determined by X-ray diffraction; and component (E): 32 parts by weight of paraffin oil per 100 parts by weight of component (B).

* * * * *